United States Patent Office 3,347,828
Patented Oct. 17, 1967

3,347,828
PROCESS FOR PRODUCING POLYTRIMEL-
LITIMIDES WITH ALKYLENE OXIDE AS
HYDROGEN HALIDE SCAVENGER
James R. Stephens, Gary, and Richard E. Van Strien, Griffith, Ind., assignors to Standard Oil Company, Chicago, Ill., a corporation of Indiana
No Drawing. Filed Mar. 7, 1967, Ser. No. 621,152
16 Claims. (Cl. 260—47)

ABSTRACT OF THE DISCLOSURE

An improved process for producing a polymeric wire enamel wherein an acid halide of a benzene polycarboxylic acid anhydride and an organic primary diamine are reacted in the presence of alkylene oxide or wherein the polyamide solution formed by the reaction of an acid halide of a benzene polycarboxylic acid anhydride and an organic primary diamine is treated with an alkylene oxide.

---

This is a continuation-in-part of Ser. No. 292,163, filed July 1, 1963, now abandoned.

This invention relates to a process for producing a polymeric wire enamel from an acid halide of a benzene polycarboxylic acid anhydride and an organic diamine, and more particularly to a process in which hydrogen halide is produced and an alkylene oxide is present to reduce the corrosive tendencies of the hydrogen halide and to improve the properties of the polymeric wire enamel.

It has been discovered that a reaction between an acid halide of a benzene tricarboxylic acid anhydride such as the acid chloride of trimellitic anhydride and an organic diamine such as p,p'-oxybis(aniline) produces a polymeric wire enamel which exhibits many desirable and unexpected properties. The polymeric wire enamel is a polyamide-imide.

The polymer has both amide and imide linkages and repeating units of

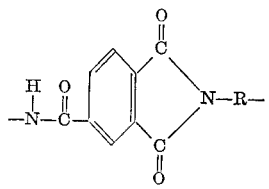

wherein R is the residue of an organic diamine.

In general, the soluble polymers may be described as polyamides having some polyimide linkages and are capable when heated of conversion to a polyamide-imide form. Such polyamides are high molecular weight polymeric compounds having in their molecule units of

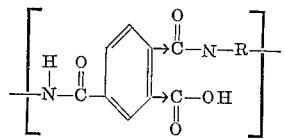

wherein → denotes isomerism and wherein R is a divalent aromatic organic radical. This organic radical consists of R', which is a divalent aromatic hydrocarbon radical or two R' divalent aromatic hydrocarbon radicals joined by stable linkages —O—, —CH$_2$—,

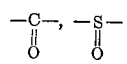

and —S—, as in the groups —R'—O—R'—,

—R'—CH$_2$—R'—

—R'—C—R'—, —R'—S—R'—

and —R'—S—R'—. The molecular weight of such polyamides made with acid halides is sufficiently high to produce upon heating a film-forming polymer. Said amides are susceptible to condensation by heating to a polyamide-imide having to a substantial extent recurring units of

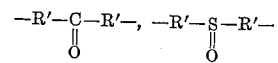

wherein R is a divalent aromatic organic radical in which, in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages of —O—, —CH$_2$—,

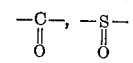

and —S—, as in the groups —R'—O—R'—,

—R'—CH$_2$—, —R'—

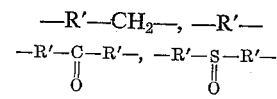

and —R'—S—R'—. A polymeric wire enamel and suitable reactants are disclosed in application Ser. No. 252,557, filed Jan. 21, 1963, now abandoned.

Typically, the process is carried out by reacting the acid chloride of trimellitic anhydride, with an organic diamine such as a polycyclic aromatic primary diamine having 1 to about 2 aromatic groups, in a polar solvent such as N,N-dimethylacetamide at a first temperature to produce a polyamide which is then reacted, as by baking, at a second temperature to produce a polyamide-imide, the desired wire enamel. The first and second temperatures are normally below 150° C. and above 150° C., and more normally in the order of about 50° C.–100° C. and about 400° C., respectively.

Suitable aromatic diamines include those having 1 or more aromatic rings, generally from 1 to about 4 aromatic rings, and preferably from 1 to about 2 aromatic rings. These may be further characterized as polycyclic aromatic compounds having two primary amino groups on a polycyclic aromatic nucleus which includes both fused ring and separated ring aromatic compounds. Suitable nuclei include phenylene, naphthalene, anthrylene, naphthacenylene and the like, and diphenylene, terephenylene, phenylnaphthalene, and quaterphenylene, and the like. The linkages between the aromatic groups may be oxy, sulfonyl, carbonyl, these being generally characterized as relatively inactive groups. The diamine may be substituted or unsubstituted with suitable substituents being ether, sulfonyl, and the lower alkyl groups. It is preferred that substituents which may interfere with the preparation of the polymer be absent, for example the chloro group. The use of the term "polyamide" is not intended to be restrictive as to structure but merely to describe a first reaction product since some imide groups are also probably present.

The reaction between the 4-acid chloride of trimellitic anhydride and a diamine such as p,p'-oxybis(aniline) proceeds first to the polyamide and then to the polyamide-imide. With suitable solvents such as N,N-dimethylacetamide, N,N-dimethyl formamide, N,N-dimethylsulfoxide, formamide, tetrahydrofuran, this is an advantage, since the polyamide remains soluble in the solvent. The liquid solution of the polyamide can then be applied to the metal wire and heated to produce the solid polyamide.

Although the resultant wire enamel is a very desirable product, its production has been troublesome in that hydrogen chloride is produced in the first reaction of acid halide with diamine and, if not removed, tends to cause the breakdown of the enamel and to corrode the wire, normally copper. In the past it has been necessary to precipitate the first reaction product, the polyamide in water or acetone to remove the entrained hydrogen chloride and then to dry and re-dissolve the product in the solvent before application to the wire. Obviously, this is very time-consuming and an undesirable procedure.

It has been discovered that the polyamide can be directly treated in solution to scavenge or remove the entrained halides. When an alkylene oxide is added to the polyamide solution the entrained halide is converted to a form which does not degrade the polyamide and can be volatilized off during the second reaction. Illustrative of this treatment is the addition of ethylene or propylene oxide to a polyamide solution in amounts of about 1–8 moles of oxide, preferably 1–1.5 moles per mole of halide (calculated from the defined acyl halide derivative) which produces satisfactory results at a temperature of less than 150° C. with times of treatment being one hour or less at about 50° C. or preferably 2–3 days at room temperature.

In the preferred process employing the acid chloride of trimellitic anhydride and p,p'-oxybis(aniline) in N,N-dimethylacetamide, the reaction proceeds to the polyamide after which the alkylene oxide such as ethylene oxide is added to scavenge or remove the entrained hydrogen chloride. The solution is allowed to stand from 1 to about 24–48 hours at room temperature or 5 to 60 min. at about 50° C. before applying it to the metal. Generally, the longer times are more desirable, especially when smaller amounts of the oxide are present, since the properties of the wire enamel are improved in many instances.

Very desirable polymeric wire enamel can also result without the troublesome water or acetone treatment when the reaction of the acid halide anhydride and diamine to the polyamide is carried out in the presence of an alkylene oxide, preferably one which forms a halohydrin boiling below about 300° C. This process is possible by reason of the fact that the alkylene oxides such as ethylene oxide do not react with the acid chloride of trimellitic anhydride and the organic primary diamine under usual reaction conditions for preparation of the polyamide. Not only does the alkylene oxide convert the entrained hydrogen halide to a halohydrin, reducing the corrosion problems, but it also improves properties, such as viscosity, of the polyamide solution, and the resultant properties of the polyamide-imide.

Suitable alkylene oxides are preferably those which form halohydrins boiling below about 300° C. since the halohydrins may then be removed along with the solvent during the second reaction or baking step. Especially desirable are the oxides having from about 2–3 carbon atoms since these are inexpensive and produce the desirable results. Suitable oxides include ethylene oxide, propylene oxide, butylene oxide, and the like, which form halohydrins boiling below about 300° C. Ethylene oxide is preferred. Such oxides can easily be determined from readily available reference books.

Normally, at least 1 mole of the oxide per mole of resident HCl, usually determined from the amount of the acid chloride is used with at least some excess, above about 1 mole/mole, being more desirable. Amounts up to about 20 moles/moles are suitable, although from above about 1 to about 8 moles/moles, especially about 2 to about 4 moles, and particularly about 3 moles, are preferred since these amounts tend to provide the desirable benefits at reasonable cost.

As noted above, the compositions of the invention suitable for producing an improved solid wire enamel are polyamide solutions composed substantially of a polyamide and a polar solvent, to which has been added a small amount of an alkylene oxide. The preferred alkylene oxide is ethylene oxide and is normally present in an amount of above about 1 mole per mole of the acid halide reactant used in the initial reaction. Suitable solvents may be generally characterized as solvents having high dielectric values and affinity for polar groups. Representative solvents include N,N-dimethylacetamide, N-methylpyrrolidone, N,N-dimethylformamide, dimethylsulfoxide and the like, with N,N-dimethylacetamide and N-methylpyrrolidone being preferred.

The preparation of a polyamide and a polyamide-imide without the practice of the instant invention is set forth in Example I to better elucidate the field of application of the invention to the workers in the art.

Example I

A mixture containing 1.05 g. (0.005 mole) of 4-acid chloride of trimellitic anhydride (prepared from trimellitic anhydride and sulfonyl chloride), 1.00 g. (0.005 mole) of p,p'-oxybis(aniline), 6 g. of N,N-dimethylacetamide (as a solvent), and 6 g. of toluene (as a solvent) in a 3 neck glass flask was purged with nitrogen. An exothermic reaction took place producing a maximum temperature of 40° C. in a few minutes. The temperature subsided back to room temperature after 30 minutes of stirring. The purge was continued slowly. The solution increased in viscosity, and in about 2 hours the viscosity leveled off. The solution was left standing closed to air at room temperature for 16 hours to complete the reaction. A polyamide was produced.

Some of the polyamide was added to a large volume of acetone, whereupon precipitation took place. The precipitate was titrated several times with fresh portions of acetone, then dried in a desiccator. This material analyzed for 6.26% N and 0.51% Cl. The theoretical values for the following structure of infinite chain length are 7.56% N and 0% Cl

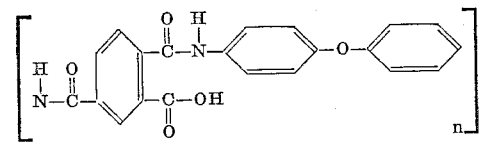

wherein $n$ is at least about 10.

Infrared analysis showed that the product contained the carboxyl group and both the amide and imide groups.

Another portion of the polyamide was spread as a film and heated for 2 hours at 150° C. in an oven. The yellow polymeric material (polyamide-imide) analyzed for 7.67% N and 1.66% Cl compared to theoretical values of 7.87% N and 0% Cl for the following structure of infinite chain length:

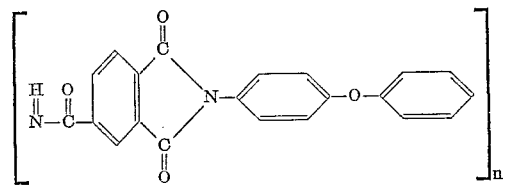

Infrared analysis of the polyamide-imide agreed well with the above structure and showed a ratio of amide to imide groups of 1.

The above results demonstrate that a polyamide was initially formed and that the subsequent heating produced a polyamide-imide.

The following examples, including comparisons of results obtained when acid halides and organic diamines are reacted in accordance with the instant invention and in accordance with the technique exemplified by Example I, are for illustrative purposes and are not intended to set forth the scope of the invention.

Example II

In the preparation of a wire enamel solution, an intimate solid mixture of 0.200 mole (42.114 g.) of the acid chloride of trimellitic anhydride and 0.200 mole (40.048 g.) of p,p'-oxybis(aniline) was added rapidly to 200 ml. of N,N-dimethylacetamide (DMAC) with continual stirring and purging with nitrogen. The temperature rose to 73° C. and was brought down to 50° C. by external cooling and the further addition to 200 ml. of DMAC. These operations required 20 minutes. The resulting solution was stirred at 50 to 53° C. for 3½ hours. The viscosity of the reaction solution increased and leveled off at a maximum of W (Gardner-Holdt) at the end of the period. The reaction solution was then cooled to room temperature.

The above solution containing the reaction product and solvent was treated with the following alkylene oxides (on the basis of 20 g. of reaction product plus solvent) and allowed to stand for the following periods of time prior to being applied to 24 gauge clean copper panels.

| Example | Oxide | Moles of Oxide/ Moles of Acid Chloride | Hrs. |
|---|---|---|---|
| III | 0.48 g. of propylene oxide | 1 | 1 hr. / 24 hrs. / 48 hrs. |
| IV | 0.96 g. of propylene oxide | 2 | 1 hr. / 24 hrs. / 48 hrs. |
| V | 2.0 g. of propylene oxide | 4 | 1 hr. / 24 hrs. |
| VI | 4.0 g. of propylene oxide | 8 | 1 hr. / 24 hrs. |
| VII | 0.37 g. of ethylene oxide | 1 | 1 hr. / 24 hrs. |
| VIII | 0.73 g. of ethylene oxide | 2 | 1 hr. / 24 hrs. |
| IX | 1.46 g. of ethylene oxide | 4 | 1 hr. / 24 hrs. |
| X | 2.92 g. of ethylene oxide | 8 | 1 hr. / 24 hrs. |

Example XI

For comparison purposes, the solution of polymer of Example II was treated according to the old procedures. The solution of the polymer was poured in a thin stream into a huge excess (at least 10 times) of water, whereupon the polymer precipitated as threads. The threads were wound upon a bobbin and allowed to soak in this medium over night, then removed, drained and soaked in excess fresh water for two days. The threads were again drained and then dried in a forced air oven at 100° F. This required about 16 hours. The dry threads were then re-dissolved at 15% in N,N-dimethylacetamide. The above formulations were applied to 24 gauge clean copper panels with a Gardner knife at a dry film thickness of ½ mil, then baked immediately at 315° C. (600° F.) for 2 minutes in a circulating air oven. Tests were then run on flexibility, impact (160 lbs.), adhesion, and impact (after bending) on the coatings. The results are listed below. The hours after the formulation represent the time between the formulation and application on the copper panels.

TABLE I

| Formulation | | Mole Ratio of Oxide/Mole of Acid Chloride | 1/8" Mandel Flexibility | 160 lb. Impact | Adhesion | Impact at crease |
|---|---|---|---|---|---|---|
| II | 1 hr. | | Fail | Fail | Poor | Fail. |
|  | 24 hrs. | | do | do | do | Do. |
|  | 48 hrs. | | do | do | do | Do. |
| XI | 1 hr. | | Pass | Pass | Excellent | Pass. |
|  | 48 hrs. | | do | do | do | Do. |
| III | 1 hr. | 1 | Fail | Fail | Poor | Fail. |
|  | 24 hrs. | | do | do | do | Do. |
|  | 48 hrs. | | do | do | do | Do. |
| IV | 1 hr. | 2 | Pass | Pass | Fair | Fail. |
|  | 24 hrs. | | do | do | do | Do. |
|  | 48 hrs. | | do | do | Good | Do. |
| V | 1 hr. | 4 | Pass | Pass | Good | Fail. |
|  | 24 hrs. | | do | do | Excellent | Pass. |
| VI | 1 hr. | 8 | Pass | Pass | Good | Pass. |
|  | 24 hrs. | | do | do | Excellent | Do. |
| VII | 1 hr. | 1 | Fail | Fail | Poor | Fail. |
|  | 24 hrs. | | do | do | do | Do. |
| VIII | 1 hr. | 2 | Fail | Fail | Fair | Fail. |
|  | 24 hrs. | | Pass-Fail | do | Fail | Do. |
| IX | 1 hr. | 4 | Pass | Pass | Good | Fail. |
|  | 24 hrs. | | do | do | Excellent | Pass. |
| X | 1 hr. | 8 | Pass | Pass | Good | Pass-Fail. |
|  | 24 hrs. | | do | do | Excellent | Pass. |

The above results demonstrate that propylene oxide or ethylene oxide in the polymeric solution produces a very satisfactory wire enamel as contrasted with the unsatisfactory results when no treatment is performed on the polymeric solution.

Example XII

A wire enamel solution was also prepared from the acid chloride of trimellitic anhydride (TMAC) and p,p'-methylenebis(aniline). An intimate solids mixture of 210.57 g. (1.00 mole) of 4-TMAC and 196.29 g. (0.990 mole) of p,p'-methylenebis(aniline) was added to 881 ml. of DMAC at 25° C. over a 15 min. period. The exothermic reaction was controlled at 50° C. by cooling. After the solids addition an additional 294 ml. of DMAC was added. The solution was then stirred at 50° C. for 3 hours during which time the viscosity steadily rose to a maximum of Z–1 (Gardner-Holdt) or 27 poises and then remained the same. The solution was then cooled to 5° C. and 105 g. (2.4 moles) of ethylene oxide was added. The mixture was stirred ½ hour gradually allowing the temperature to rise to 17° C. The solution after filtration was then ready for application as a wire enamel. This solution when baked at 600° F. on a 24 gauge copper panel will produce a solid enamel having improved properties similar to those of the enamel produced by p,p'-oxybis(aniline).

In addition to the acid chloride, other acid halides such as the acid bromide may be also employed to produce desired products.

Thus, having described the invention what is claimed is:

1. In a process for producing a polyamide-imide for use as a wire enamel from an acid halide of a benzene tricarboxylic acid anhydride and an aromatic primary diamine, wherein the aromatic radical consists essentially of divalent mono and polyaromatic hydrocarbons containing 1 to 4 aromatic rings wherein said multiple rings are joined directly or by members selected from the group consisting of oxy, sulfonyl, carbonyl and lower alkylene groups, in which hydrogen halide is produced, said tricarboxylic acid halide and diamine being reacted at a first lower temperature below 150° C. effective to produce a polyamide soluble in N,N,-dimethylacetamide which polyamide is then heated at a second higher temperature above 150° C. effective to produce said polyamide-imide insoluble in N,N-dimethylacetamide, said acid halide being selected from the group consisting of acid chloride and acid bromide, the improvement in said process comprising scavenging the entrained hydrogen halide with an alkylene oxide containing 2 to 4 carbon atoms in a straight chain and capable of forming a halohydrin boiling below about 300° C. thus reducing the corrosive tendencies of said hydrogen halide and improving the properties of said polyamide-imide.

2. The process of claim 1 wherein the first lower temperature for producing the soluble polyamide is below 100° C. and the higher temperature effective to produce the polyamide-imide is above 150° C.

3. The process of claim 1 wherein said acid halide is an acid chloride of trimellitic anhydride.

4. The process of claim 3 wherein said aromatic diamine is a polycyclic aromatic primary diamine having 1 to about 2 aromatic groups.

5. The process of claim 1 wherein said alkylene oxide has about 2–3 carbon atoms.

6. The process of claim 1 wherein said alkylene oxide is ethylene oxide.

7. The process of claim 6 wherein said ethylene oxide is present in about 1 to about 4 moles per mole of hydrogen chloride produced in the reaction.

8. In a process for producing a polyamide for use as a polyamide-imide wire enamel from an acid halide of a benzene tricarboxylic acid anhydride and an aromatic primary diamine, wherein the aromatic radical consists essentially of divalent mono and polyaromatic hydrocarbons containing 1 to 4 aromatic rings wherein said multiple rings are joined directly or by members selected from the group consisting of oxy, sulfonyl, carbonyl and lower alkylene groups, in which hydrogen halide is produced, said tricarboxylic acid halide and diamine being reacted at a temperature below 150° C. effective to produce a polyamide soluble in N,N-dimethylacetamide, said acid halide being selected from the group consisting of acid chloride and acid bromide, the improvement in said process comprising scavenging the entrained hydrogen halide with an alkylene oxide containing 2 to 4 carbon atoms in a straight chain and capable of forming a halohydrin boiling below about 300° C. thus reducing the corrosive tendencies of said hydrogen halide.

9. The process of claim 8 wherein said first temperature is below 100° C. and said alkylene oxide is present in about 3 moles per mole of hydrogen chloride produced in the reaction.

10. The process of claim 8 wherein said diamine is, p,p'-oxybis(aniline).

11. The process of claim 8 wherein said diamine is p,p'-methylenebis(aniline).

12. In a process for producing a polyamide-imide for use as a wire enamel by reaction of an acid halide of a benzene tricarboxylic acid anhydride and an aromatic primary diamine, wherein the aromatic radical consists essentially of divalent mono and polyaromatic hydrocarbons containing 1 to 4 aromatic rings wherein said multiple rings are joined directly or by members selected from the group consisting of oxy, sulfonyl, carbonyl and lower alkylene groups, in which hydrogen halide of reaction is produced, said tricarboxylic acid halide and diamine being reacted at a first lower temperature below 150° C. effective to produce a polyamide soluble in N,N-dimethylacetamide which polyamide is then heated at a second higher temperature above 150° C. effective to produce said polyamide-imide insoluble in N,N-dimethylacetamide, said acid halide being selected from the group consisting of acid chloride and acid bromide, the improvement in said process comprising the carrying out of said reaction in the presence of an alkylene oxide containing 2 to 4 carbon atoms in a straight chain and capable of forming a halohydrin boiling below about 300° C. to reduce the corrosive tendencies of said hydrogen halide and to improve the properties of said polyamide-imide.

13. In a process for producing a polyamide-imide for use as a wire enamel from the acid chloride of trimellitic anhydride and p,p'-oxybis(aniline) in which hydrogen chloride of reaction is produced, said trimellitic acid chloride and diamine being reacted at a temperature effective to produce a polyamide soluble in N,N-dimethylacetamide, said acid chloride of trimellitic anhydride and p,p'-oxybis(aniline) being reacted in an organic polar solvent at a first lower temperature below 150° C. effective to produce polyamide soluble in N,N-dimethylacetamide, which is then reacted at a second higher temperature above 150° C. effective to produce said polyamide-imide insoluble in N,N-dimethylacetamide, the improvement in said process comprising scavenging the entrained hydrogen chloride with an alkylene oxide containing from about 2 to about 3 carbon atoms to reduce corrosive tendencies of said polyamide-imide.

14. The process of claim 13 wherein said polar solvent is dimethylacetamide.

15. In a process for producing a polyamide-imide for use as a wire enamel from the acid chloride of trimellitic anhydride and p,p'-methylenebis(aniline) in which hydrogen chloride of reaction is produced, said trimellitic acid chloride and diamine being reacted at a temperature effective to produce a polyamide soluble in N,N-dimethylacetamide, said acid chloride of trimellitic anhydride and p,p'-methylenebis(aniline) being reacted in an organic polar solvent at a first lower temperature below 150° C. effective to produce polyamide soluble in N,N-dimethylacetamide which is then reacted at a second higher temperature above 150° C. effective to produce said polyamide-imide insoluble in N,N-dimethylacetamide, the improvement in said process comprising scavenging the entrained hydrogen halide with an alkylene oxide containing from about 2 to about 3 carbon atoms to reduce the corrosive tendencies of said polyamide-imide.

16. The process of claim 15 wherein said polar solvent is dimethylacetamide.

References Cited
UNITED STATES PATENTS

| | | | |
|---|---|---|---|
| 2,421,024 | 5/1947 | Frosch | 260—78 |
| 3,086,961 | 4/1963 | House | 260—45.7 |
| 3,179,633 | 4/1965 | Endrey | 260—78 |
| 3,179,634 | 4/1965 | Edwards | 260—78 |

FOREIGN PATENTS 570,858   7/1945   Great Britain.

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,347,828                               October 17, 1967

James R. Stephens et al.

It is certified that error appears in the above identified patent and that said Letters Patent are hereby corrected as shown below:

Column 1, lines 67 to 69, the formula reading $$\underset{\underset{O}{\|}}{-S-}$$ should read $-SO_2$ Column 2, lines 1 to 3, the formula reading $$\underset{\underset{O}{\|}}{-R'-S-R'-}$$ should read $-R'-SO_2-R'-$ same column 2, lines 23 to 25, the formula reading $$\underset{\underset{O}{\|}}{-S-}$$ should read $-SO_2-$ same column 2, lines 29 to 31, the formula reading $$\underset{\underset{O}{\|}}{-R'-S-R'-}$$ should read $-R'-SO_2-R'-$ Signed and sealed this 23rd day of December 1969.

(SEAL)
Attest:

EDWARD M. FLETCHER, JR.                    WILLIAM E. SCHUYLER, JR.
Attesting Officer                            Commissioner of Patents